United States Patent Office 3,387,510
Patented June 11, 1968

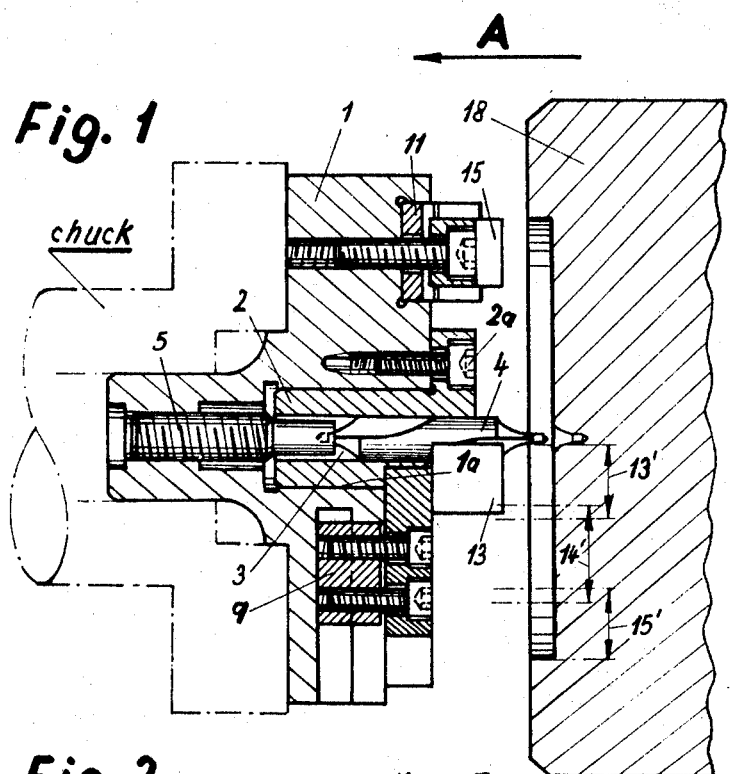
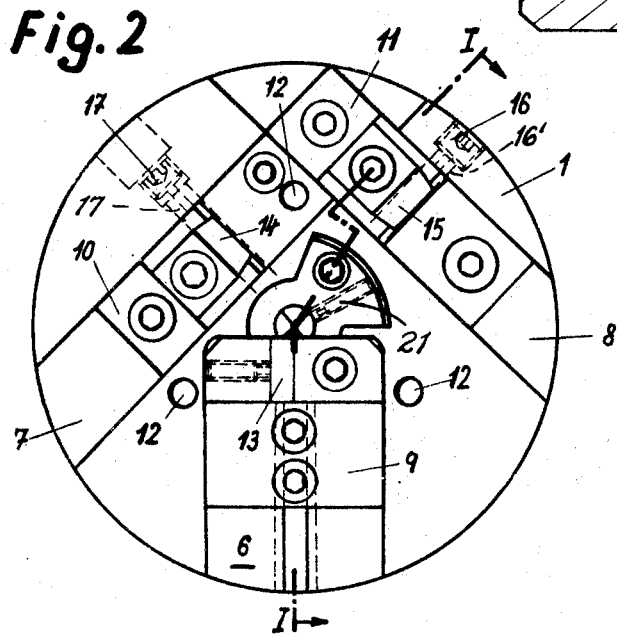

3,387,510
DEVICE FOR CUTTING TO LENGTH AND CENTERING WORKPIECES AND STOCK MATERIAL
Hermann Landolt, Schaffhausen, Switzerland, assignor to Georg Fischer Aktiengesellschaft, Schaffhausen, Switzerland
Filed Jan. 21, 1966, Ser. No. 522,309
Claims priority, application Switzerland, Jan. 29, 1965, 1,293/65
1 Claim. (Cl. 77—65)

ABSTRACT OF THE DISCLOSURE

Device for cutting to length and centering workpieces in which a rotatable body has a central bushing for supporting a centering drill and has holders for cutting elements mounted thereon for cutting the end of the workpiece in respectively different radial regions thereof, with the said radial regions overlapping and with at least some of said cutting elements being adjustable axially on the body.

---

The present invention relates to a tool or device for cutting to length and centering workpieces, for instance shafts and bar-shaped stock material.

Devices of the abovementioned type and for the abovementioned purpose are known but have the drawback that the exchange of the machining tools is difficult and not always possible. Depending on the type and size of the workpiece to be machined, it is frequently imperative that such workpieces are to be provided with centering bores of different diameters and are furthermore to be provided with surfaces to be planed. These requirements make it necessary that machining tools of different sizes must always be available for the respective changing requirements. The costs for machining tools of different sizes are relatively high.

It is, therefore, an object of the present invention to provide a device for cutting to length and centering workpieces, especially shafts and bar-shaped stock material, which will overcome the above mentioned drawbacks.

It is another object of this invention to provide a device as set forth above, which will considerably reduce the costs for such device and the machining tools to be used in connection therewith.

These and other objects and advantages of the invention will appear more clearly from the following specification in connection with the accompanying drawing, in which:

FIG. 1 represents a section through a device according to the invention, said section being taken along the line I—I of FIG. 2.

FIG. 2 shows the device of FIG. 1 as seen in the direction of the arrow A.

Figure 3:
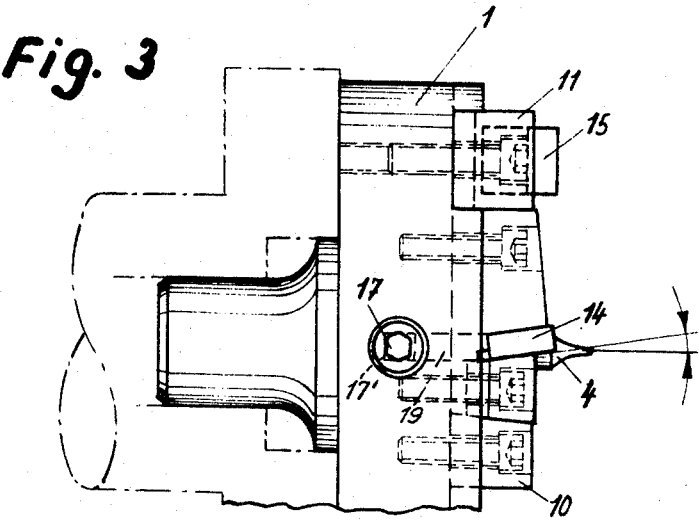
FIG. 3 shows the device with a cutting plate having a negative rake angle.

The device according to the present invention is charterized primarily in that a base body of the device has detachably connected thereto holding means for holding cutting and revolving plates and exchangeable bushing means for receiving a center drill, and that furthermore said holding means is radially adjustably arranged on a guiding path, said holding means and said cutting and revolving plates being adapted to be held at different distances from the axis of rotation of said center drill.

Referring now to the drawing in detail, the device shown therein comprises a circular base body 1 having its central portion provided with a bore 1a. Exchangeably mounted in said bore 1a is a bushing 2 which is fixedly connected to base body 1 by means of screws 2a (one only being shown). Bushing 2 has a bore 3 in which a center drill 4 is arranged in a manner known per se and held by set screw 21. When it is desired to exchange center drill 4 for another drill, screw 21 is loosened to permit the drill to be removed and another is placed in the holder and screw 21 is again tightened. Screw 5 provides an adjustable inner stop for the drill.

Base body 1 has three guiding grooves 6, 7, and 8 in which so-called revolving plates 9, 10, 11 are guided and clamped fast for holding cutting plates of different widths for purposes of planing a workpiece. Base body 1 is additionally provided with bores 12 through which, during the operation of the device, cooling fluid may be conveyed to the machining tools, said bores being adapted to be connected with a source of corresponding cooling fluid.

Figure 4:
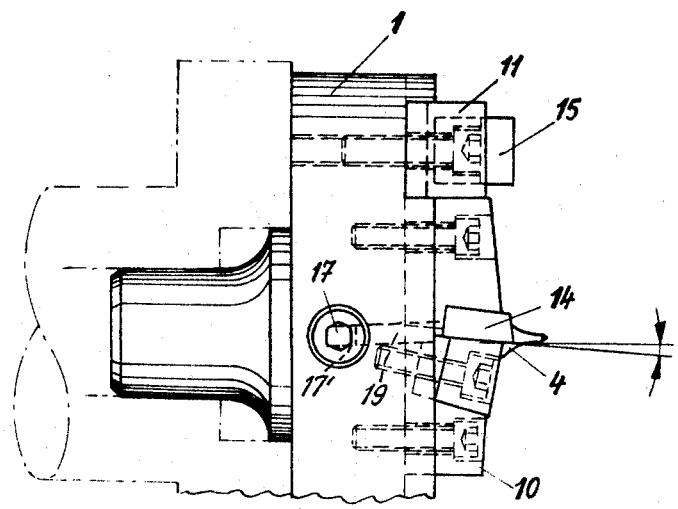
FIG. 4 shows the same device with a cutting plate having a positive rake angle.

If, for instance, it is desired to employ a center drill with a larger diameter than that shown in FIG. 1, it is merely necessary to exchange bushing 2 for another bushing with a larger diameter bore. The larger diameter center drill will then be introduced and clamped fast in the bushing of corresponding inner diameter and will be assured against rotation relative to body 1. The determination of the diameter of the surface to be planed depends on the diameter of the workpiece to be cut to length. For smaller diameters, the revolving plate holder 9 which is adjustable and arrestable in guiding groove 6 may be employed. By exchanging said holder, it is possible to employ different cutting plates 13 with positive and negative rake angle, as shown in FIGS. 3 and 4. When the diameter of the workpiece exceeds a certain dimension, it is possible by means of another revolving plate holder 10 in groove 7 to employ another cutting plate 14. When a certain size of the workpiece diameter has been reached, also holder 10 will become insufficient, and with a workpiece of a still larger diameter, a third cutting plate 15 may be employed which is adapted to be clamped fast on holder 11 in groove 8. By exchanging the holders 10 and 11, in a manner analogous to the revolving plate holder 9, cutting plates 14 and 15 of different size may be employed. The plates are so adjusted that they will overlap in the radial direction of body 1 by about from 1 to 2 millimeters (see FIG. 1—13', 14' and 15'). Plates 14 and 15 on holders 10 and 11 are by means of adjusting screws 16' and 17', adjustable in axial direction relative to the cutting plate on holder 9. Screws 16' and 17' have socket heads 16, 17, and actuate wedges or the like to effect the said adjustment. One such wedge is shown at 19 in FIGURES 3 and 4 cooperating with screw 17' and cutting plate 14. This adjustability permits the obtainment of a step-free end face of workpiece 18 to be cut to length.

The device according to the present invention is particularly suitable for the machining of workpieces of different sizes. A device according to the present invention no longer requires the exchange of one tool for another when cutting to length and centering workpieces of different size.

As will be seen in FIGURES 3 and 4, in changing from a negative rake tool to a positive rake tool, the elements for clamping the tool in place are also exchanged.

It is, of course, to be understood that the present invention is, by no means, limited to the particular arrangement shown in the drawing but also comprises any modifications within the scope of the appended claims.

What I claim is:

1. A device for cutting to length and centering workpieces, especially shafts and bar-shaped stock material, which includes: a rotatable base body provided with a plurality of guiding paths and having its central portion provided with an axial bore, one of said guiding paths extending in the radial direction of said base body, a clamping bushing exchangeably arranged within said bore and detachably connected to said base body, a center drill detachably clamped in said clamping bushing, cutting plate holding means respectively arranged in said paths, cutting plates clamped in said holding means and having cutting edges extending substantially radially of said base body for planing a workpiece, said cutting plates being supported in their respective holding means so as to be held at different radial distances from the axis of rotation of said rotatable base body, said holding means pertaining to the guiding paths other than said one guiding path having means pertaining thereto for fine adjustment of the respective cutting plates supported therein in the direction of the axis of rotation of said rotatable base body, and means pertaining to the said holding means in said one guiding path for adjustment thereof in the radial direction of said base body to dispose the radially inner edge of the respective cutting plate in the region which is cut by said center drill.

References Cited

UNITED STATES PATENTS 3,228,267  1/1966  Hebert _____ 77—65

FOREIGN PATENTS 700,830  12/1953  Great Britain.

FRANCIS S. HUSAR, *Primary Examiner.*